(12) United States Patent
Christensen

(10) Patent No.: US 11,126,448 B1
(45) Date of Patent: *Sep. 21, 2021

(54) SYSTEMS AND METHODS FOR USING DYNAMIC TEMPLATES TO CREATE APPLICATION CONTAINERS

(71) Applicant: Veritas Technologies LLC, Santa Clara, CA (US)

(72) Inventor: Aaron Christensen, Apple Valley, MN (US)

(73) Assignee: Veritas Technologies LLC, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/744,092

(22) Filed: Jan. 15, 2020

Related U.S. Application Data

(63) Continuation of application No. 15/465,570, filed on Mar. 21, 2017, now Pat. No. 10,540,191.

(51) Int. Cl.
| | | |
|---|---|---|
| *G06F 9/445* | (2018.01) | |
| *G06F 9/455* | (2018.01) | |
| *G06F 9/50* | (2006.01) | |
| *G06F 8/60* | (2018.01) | |

(52) U.S. Cl.
CPC ............... *G06F 9/455* (2013.01); *G06F 8/60* (2013.01); *G06F 9/44505* (2013.01); *G06F 9/50* (2013.01)

(58) Field of Classification Search
CPC .................................. G06F 9/455; G06F 8/61
USPC ......................................................... 717/177
See application file for complete search history.

(56) References Cited

U.S. PATENT DOCUMENTS

| | | |
|---|---|---|
| 5,956,028 A | 9/1999 | Matsui et al. |
| 7,702,866 B2 | 4/2010 | Beardsley et al. |
| 8,266,616 B1 | 9/2012 | Jacquot et al. |
| 8,869,140 B2 | 10/2014 | Todorova |
| 9,075,638 B2 | 7/2015 | Barnett et al. |
| 9,176,720 B1 | 11/2015 | Day-Richter et al. |
| 9,203,862 B1 | 12/2015 | Kashyap et al. |

(Continued)

OTHER PUBLICATIONS

Nur Suwaibah Binti Mohd Zaki; "Managing Storage in Cluster and Docker Container By Using Kubernetes"; Bachelor of Computer Sciences (Computer Network Security) Faculty of Informatics and Computing—OGOS 2018.*

(Continued)

*Primary Examiner* — Francisco J Aponte
(74) *Attorney, Agent, or Firm* — FisherBroyles, LLP

(57) ABSTRACT

The disclosed computer-implemented method for using dynamic templates to create application containers may include (i) identifying an application that is to be deployed in a container, (ii) creating a dynamic template that comprises at least one variable parameter and that defines at least a portion of an operating environment of the container (iii) generating a value of the variable parameter during deployment of the application, (iv) processing the dynamic template to create a configuration file that comprises the value of the variable parameter, and (v) triggering a container initialization system to create, based on the configuration file, the container such that the container isolates a user space of the application from other software on a host system while sharing a kernel space with the other software. Various other methods systems, and computer-readable media are also disclosed.

20 Claims, 5 Drawing Sheets

(56) References Cited

U.S. PATENT DOCUMENTS

| | | | |
|---|---|---|---|
| 9,213,541 | B2 | 12/2015 | Araya et al. |
| 9,256,467 | B1 | 2/2016 | Singh et al. |
| 9,367,305 | B1 | 6/2016 | Kumar et al. |
| 9,396,061 | B1 | 7/2016 | Nair |
| 9,785,643 | B1 | 10/2017 | Patil et al. |
| 9,888,067 | B1 | 2/2018 | Yemini et al. |
| 9,916,233 | B1* | 3/2018 | Qureshi ............ G06F 9/45533 |
| 9,983,891 | B1 | 5/2018 | Christensen |
| 10,073,974 | B2 | 9/2018 | Hwang et al. |
| 10,127,030 | B1 | 11/2018 | Mortman et al. |
| 10,169,023 | B2 | 1/2019 | Ciano et al. |
| 10,360,053 | B1 | 7/2019 | Christensen et al. |
| 10,514,947 | B2* | 12/2019 | Kondo ................ G06F 9/4806 |
| 10,740,132 | B2* | 8/2020 | Goel .................. G06F 9/45558 |
| 10,963,349 | B2* | 3/2021 | Dhamdhere ........ G06F 11/1451 |
| 2002/0069399 | A1 | 6/2002 | Miloushev et al. |
| 2002/0069400 | A1 | 6/2002 | Miloushev et al. |
| 2002/0120924 | A1 | 8/2002 | Miloushev et al. |
| 2003/0056205 | A1 | 3/2003 | Miloushev et al. |
| 2003/0135850 | A1 | 7/2003 | Miloushev et al. |
| 2004/0148367 | A1 | 7/2004 | Takano et al. |
| 2005/0246357 | A1 | 11/2005 | Geary et al. |
| 2006/0005189 | A1 | 1/2006 | Vega et al. |
| 2008/0028379 | A1 | 1/2008 | Stichnoth |
| 2009/0077422 | A1 | 3/2009 | Khaladkar et al. |
| 2009/0210869 | A1 | 8/2009 | Gebhart et al. |
| 2009/0265712 | A1 | 10/2009 | Herington |
| 2011/0047525 | A1 | 2/2011 | Castellanos et al. |
| 2011/0191537 | A1 | 8/2011 | Kawaguchi et al. |
| 2011/0197188 | A1 | 8/2011 | Srinivasan et al. |
| 2012/0005153 | A1 | 1/2012 | Ledwich et al. |
| 2014/0181816 | A1 | 6/2014 | Muller et al. |
| 2014/0201374 | A1 | 7/2014 | Ashwood-Smith et al. |
| 2015/0032688 | A1 | 1/2015 | Dayon et al. |
| 2015/0120928 | A1 | 4/2015 | Gummaraju et al. |
| 2015/0150003 | A1* | 5/2015 | Emelyanov ............ G06F 9/455 718/1 |
| 2015/0269006 | A1 | 9/2015 | Caufield et al. |
| 2015/0310209 | A1 | 10/2015 | Zhang |
| 2015/0363181 | A1 | 12/2015 | Alberti et al. |
| 2016/0004848 | A1 | 1/2016 | Gocek et al. |
| 2016/0098285 | A1* | 4/2016 | Davis .................. G06F 9/45558 718/1 |
| 2016/0162320 | A1 | 6/2016 | Singh et al. |
| 2016/0171222 | A1 | 6/2016 | Panchbudhe et al. |
| 2016/0182315 | A1 | 6/2016 | Salokanto et al. |
| 2016/0217176 | A1 | 7/2016 | Haviv et al. |
| 2016/0359955 | A1 | 12/2016 | Gill et al. |
| 2016/0371108 | A1* | 12/2016 | Madtha .................... H04L 67/10 |
| 2016/0378518 | A1 | 12/2016 | Antony et al. |
| 2017/0052807 | A1* | 2/2017 | Kristiansson ............. G06F 9/54 |
| 2017/0060605 | A1 | 3/2017 | Huang |
| 2017/0083541 | A1 | 3/2017 | Mann et al. |
| 2017/0115977 | A1 | 4/2017 | Kim et al. |
| 2017/0154017 | A1 | 6/2017 | Kristiansson et al. |
| 2017/0177860 | A1* | 6/2017 | Suarez .................... G06F 21/53 |
| 2017/0228246 | A1 | 8/2017 | Kotha et al. |
| 2017/0235609 | A1 | 8/2017 | Wires et al. |
| 2017/0242617 | A1 | 8/2017 | Walsh et al. |
| 2017/0249469 | A1 | 8/2017 | Goyal et al. |
| 2017/0264684 | A1 | 9/2017 | Spillane et al. |
| 2017/0277524 | A1 | 9/2017 | Bhat et al. |
| 2017/0279797 | A1 | 9/2017 | Cross, Jr. et al. |
| 2017/0315795 | A1 | 11/2017 | Keller |
| 2017/0322966 | A1 | 11/2017 | Tran et al. |
| 2017/0337054 | A1 | 11/2017 | Parees et al. |
| 2017/0344292 | A1 | 11/2017 | Sterin et al. |
| 2018/0004570 | A1 | 1/2018 | Maupu et al. |
| 2018/0046457 | A1 | 2/2018 | Branca |
| 2018/0060402 | A1 | 3/2018 | Fabjanski et al. |
| 2018/0129479 | A1 | 5/2018 | McPherson et al. |
| 2018/0157505 | A1 | 6/2018 | Kairali et al. |
| 2018/0157517 | A1* | 6/2018 | Dong .................. G06F 9/45558 |
| 2018/0267785 | A1* | 9/2018 | Holman ................ G06F 9/5077 |
| 2018/0307537 | A1* | 10/2018 | Chen ...................... G06F 9/4881 |
| 2018/0336113 | A1 | 11/2018 | Asawa et al. |

OTHER PUBLICATIONS

Amar Ibrahim Elhaj Sharaf Eldein; "A Container-Based Architecture for the Design of Portable Cloud Applications"; Sudan University of Science and Technology College of Graduate Studies—Mar. 2019.*

Kasireddy, Preethi, "A Beginner-Friendly Introduction to Containers, VMs and Docker," accessed at https://medium.freecodecamp.org/a-beginner-friendly-introduction-to-containers-vms-and-docker-79a9e3e119b, published on Mar. 4, 2016, 21 pages.

Kang et al., "Container and Microservice Driven Design for Cloud Infrastructure DevOps", IEEE International Conference on Cloud Engineering (IC2E), 2016, pp. 202-211.

Apache Mesos, http://mesos.apache.org, last accessed Jan. 25, 2017.

AWS Lambda, https://aws.amazon.com/lambda/, last accessed Jan. 25, 2017.

Docker container support, last accessed Jan. 25, 2017.

Dray—Docker Workflow Engine, http://dray.it/, last accessed Jan. 25, 2017.

Docker ETL Rest server github, https://github.com/bmamlin/docker-etl-rest-server, last accessed Jan. 25, 2017.

Docker Nifi github, https://github.com/jdye64/docker-nifi, last accessed Jan. 25, 2017.

Mesos/Chronos github, https://github.com/mesos/chronos, last accessed Jan. 25, 2017.

Apache Nifi for Docker, https://github.com/apiri/dockerfile-apache-nifi, last accessed Jan. 25, 2017.

Coho Data, https://www.cohodata.com/intel, last accessed Jan. 25, 2017.

Iron.io, https://www.iron.io/, last accessed Jan. 25, 2017.

Jenkins and Docker, https://www.cloudbees.com/continuous-delivery/jenkins-docker, last accessed Jan. 25, 2017.

Pachyderm.io, https://www.pachyderm.io/, last accessed Jan. 25, 2017.

Syncsort ETL, last accessed Jan. 25, 2017.

Talend and Docker, last accessed Jan. 25, 2017.

What is Docker?, https://www.docker.com/what-docker, last accessed Jan. 25, 2017.

Docker Swarm product overview, https://www.docker.com/products/docker-swarm, last accessed Feb. 28, 2017.

Kubernetes Basics, https://kubernetes.io/docs/tutorials/kubernetes-basics/, last accessed Feb. 28, 2017.

Attach a volume to a container while it is running; http://jpetazzo.github.io/2015/01/13/docker-mount-dynamic-volumes/, as accessed Feb. 23, 2017 (Jan. 13, 2015); Github.

Manage data in containers; https://docs.docker.com/engine/tutorials/dockervolumes/#/backup-restore-ormigrate-data-volumes, as accessed Feb. 23, 2017 (Sep. 3, 2016); Docker.

Docker—Data Volumes and Data Containers (4); http://www.tricksofthetrades.net/2016/03/14/docker-data-volumes/, as accessed Feb. 23, 2017 (Mar. 14, 2016); Tricks of the Trades.

Understanding Volumes in Docker; http://container-solutions.com/understandingvolumes-docker/, as accessed Feb. 23, 2017 (Jul. 6, 2015); Container Solutions Amsterdam.

Docker mounting volumes on host; http://stackoverflow.com/questions/25311613/docker-mounting-volumes-on-host, as accessed Feb. 23, 2017 (Aug. 14, 2014); stackoverflow.

Understand images, containers, and storage drivers; https://docs.docker.com/engine/userguide/storagedriver/imagesandcontainers/, as accessed Feb. 23, 2017 (Nov. 7, 2015); Docker.

A Not Very Short Introduction to Docker; https://blog.jayway.com/2015/03/21/a-notvery-short-introduction-to-dockert, as accessed Feb. 23, 2017 (Mar. 21, 2015); jayway.

Use data volume containers; https://getcarina.com/docs/tutorials/data-volumecontainers/, as accessed Feb. 23, 2017 (Oct. 23, 2015); Rackspace.

What is the differences between Data Scientist Workbench and Knowledge Anyhow Workbench; http://support.datascientistworkbench.

(56) References Cited

OTHER PUBLICATIONS com/knowledgebase/articles/738753-what-isthe-differences-between-data-scientist-wor, as accessed Feb. 14, 2017 (Jan. 13, 2016); Big Data University.
Rodeo Basics; http://rodeo.yhat.com/docs/, as accessed Feb. 14, 2017 (Nov. 14, 2015); Rodeo.
Extract, transform, load; https://en.wikipedia.org/wiki/Extract,_transform,_load, as accessed Feb. 14, 2017 (Aug. 15, 2004); Wikipedia.
What is Docker; http://searchitoperations.techtarget.com/definition/Docker as accessed Jan. 28, 2017.
Platform as a Service; https://en.wikipedia.org/wiki/Plafform_as_a_service; as accessed Jan. 28, 2017.
What is Scale out Storage; http://whatis.techtarget.com/definition/scale-out-storage; as accessed Jan. 28, 2017.
Real-Time Data Analysis with Kubernetes, Redis, and BigQuery; htttps://cloud.google.com/solutions/real-time/kubernetes-redis-bigquery; as accessed Jan. 28, 2017.
Operating-system-level virtualization; https://en.wikipedia.org/wiki/Operating-systemlevel_virtualization; as accessed Jan. 28, 2017.
Advanced Analytics Products; http://www.sas.com/en_us/software/analytics.html#view-all-products; as accessed Jan. 31, 2017.
Containerized Cloud Analytics—SAS Analytics for Containers; http://www.sas.com/en_us/software/analytics-for-containers.html; as accessed Jan. 31, 2017.
Container Cluster; https://cloud.google.com/containerengine/docs/clusters/#what_is_a_container_cluster; as accessed Jan. 31, 2017.
Object Storage; https://en.wikipedia.org/wiki/Object_storage; as accessed Jan. 30, 2017.
Clustered file system; https://en.wikipedia.org/wiki/Clustered_file_system; as accessed Jan. 30, 2017.
Wikipedia; Operating-system-level virtualization; https://en.wikipedia.org/wiki/Operating-system-level_virtualization, as accessed on Feb. 14, 2017.
Plugins_volume.md; https://github.com/docker/docker/blob/master/docs/extend/plugins_volume.md, as accessed on Feb. 14, 2017.
Ryan Schroeder et al.; Systems and Methods for Automatically Linking Data Analytics to Storage; U.S. Appl. No. 15/428,134, filed Feb. 8, 2017.
Ryan Schroeder et al.; Systems and Methods for Performing Storage Location Virtualization; U.S. Appl. No. 15/432,614, filed Feb. 14, 2017.
Kirk Searls et al.; Systems and Methods for Building an Extract, Transform, Load Pipeline; U.S. Appl. No. 15/431,971, filed Feb. 14, 2017.

* cited by examiner

SYSTEMS AND METHODS FOR USING DYNAMIC TEMPLATES TO CREATE APPLICATION CONTAINERS

CROSS REFERENCE TO RELATED APPLICATION

This application is a continuation of U.S. application Ser. No. 15/465,570, filed on Mar. 21, 2017, the disclosure of which is incorporated, in its entirety, by this reference.

BACKGROUND

In the past, large-scale computing projects were limited to individuals and enterprises that owned large physical data centers with towering racks of computers. Now, distributed computing allows anyone with the resources to buy server space to run as many instances of their preferred computing device as desired. Further efficiency improvements have been introduced in the form of application containers that allow administrators to run applications without requiring the resources necessary to simulate an entire virtualized operating system for each virtualized application. Containers may reduce the processing requirements for each application, allowing a greater number of applications to be run on the same host. Containers can be used for anything from short-lived operations lasting minutes to long-lived operations lasting weeks or months, and can be configured to run a wide variety of applications in order to complete a wide variety of computing tasks.

Traditional systems for using containers to complete computing tasks may have a low degree of automation, requiring a user to manually configure and launch each container. Some traditional systems for launching containers may rely on static configuration files that cannot respond to the environment in which the container is launched. The instant disclosure, therefore, identifies and addresses a need for systems and methods for using dyna templates to create application containers.

SUMMARY

As will be described in greater detail below, the instant disclosure describes various systems and methods for using dynamic templates to create application containers by generating static configuration files for the application containers based on values calculated by the dynamic templates.

In one example, a computer-implemented method for using dynamic templates to create application containers may include (i) identifying an application that is to be deployed in a container, (ii) creating a dynamic template that includes at least one variable parameter and that defines at least a portion of an operating environment of the container, (iii) generating a value of the variable parameter during deployment of the application, (iv) processing the dynamic template to create a configuration file that includes the value of the variable parameter, and (v) triggering a container initialization system to create, based on the configuration file, the container such that the container isolates a user space of the application from other software on a host system while sharing a kernel space with the other software.

In some examples, generating the value of the variable parameter during deployment of the application may include using a function stored in the dynamic template to calculate the value of the variable parameter. In some examples, generating the value of the variable parameter during deployment of the application may include determining a path of an external resource on the host system based at least in part on data about the external resource stored in the dynamic template.

Additionally or alternatively, generating the value of the variable parameter during deployment of the application may include receiving external input about the variable parameter during deployment of the application and generating the value of the variable parameter based at least in part on the external input. In one embodiment, the configuration file may be a default type of configuration file for the container and may not be able to generate values for dynamic variables during deployment.

In one embodiment, the computer-implemented method may further include (i) identifying an additional application that is to be deployed in an additional container, generating a new value of the variable parameter during deployment of the additional application, where the new value of the variable parameter is different from the value of the variable parameter, (iii) processing the dynamic template to create an additional configuration file that includes the new value of the variable parameter, and (iv) triggering the container initialization system to create, based on the additional configuration file, the additional container. In some embodiments, the computer-implemented method may further include (i) identifying an additional application that is to be deployed in an additional container, (ii) creating an additional dynamic template that includes the variable parameter and that defines at least a portion of an operating environment of the additional container, (iii) processing the additional dynamic template to create an additional configuration file that includes the value of the variable parameter at least in part by launching a resource that is external to the container and the additional container, (iv) triggering the container initialization system to create, based on the additional configuration file, the additional container, and (v) enabling both the container and the additional container to access the resource.

In one embodiment, a system for implementing the above-described method may include (i) an identification module, stored in memory, that identifies an application that is to be deployed in a container (ii) a creation module stored in memory, that creates a dynamic template that includes at least one variable parameter and that defines at least a portion of an operating environment of the container, (iii) a generation module, stored in memory that generates a value of the variable parameter during deployment of the application, (iv) a processing module, stored in memory that processes the dynamic template to create a configuration file that includes the value of the variable parameter, (v) a triggering module, stored in memory, that triggers a container initialization system to create, based on the configuration file, the container such that the container isolates a user space of the application from other software on a host system while sharing a kernel space with the other software, and (vi) at least one physical processor configured to execute the identification module, the creation module, the generation module, the processing module, and the triggering module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) identify an application that is to be deployed in a container, (ii) create a dynamic template that includes at least one variable parameter and that defines at least a portion of an operating environment of the container, (iii) generate a value of the variable parameter during deployment of the application, (iv) process the dynamic template to create a configuration file that includes the value of the variable parameter, and (v) trigger a container initialization system to create, based on the configuration file, the container such that the container isolates a user space of the application from other software on a host system while sharing a kernel space with the other software.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
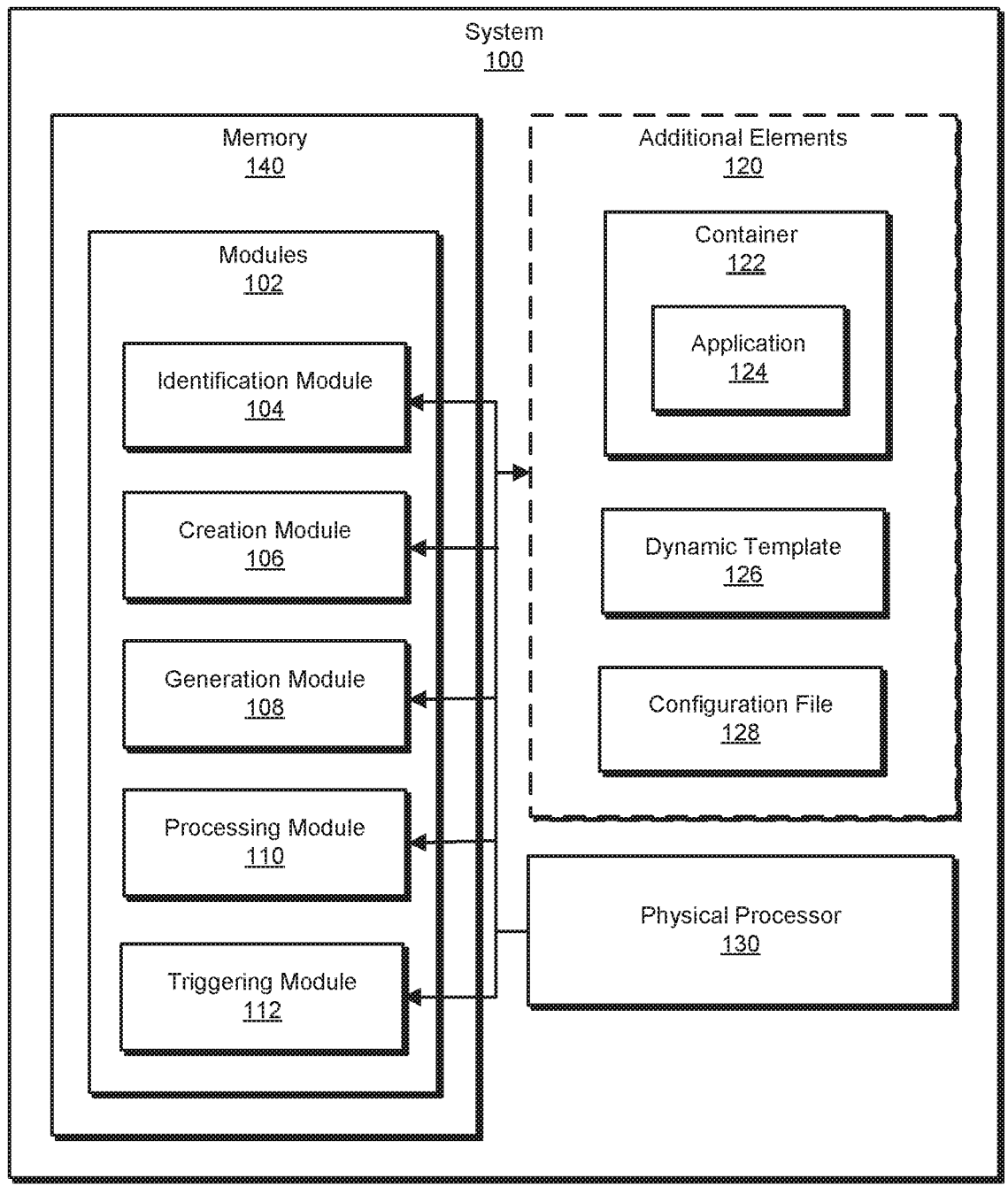
FIG. 1 is a block diagram of an example system for using dynamic templates to create application containers.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for using dynamic templates to create application containers. As will be explained in greater detail below, by generating configuration files based on dynamic templates that are capable of calculating variable settings at run time, the systems and methods described herein may streamline the launching of multiple similar—but not identical—containers. By using templates to generate configuration files this way, the systems and methods described herein may improve the efficiency of the process from a user perspective as well as decrease the computing resources needed to store a large library of static configuration files. In addition, the systems and methods described herein may improve the functioning of the computing device by enabling the computing device to more efficiently launch containers by reducing the amount of user intervention required to configure containers.

Figure 2:
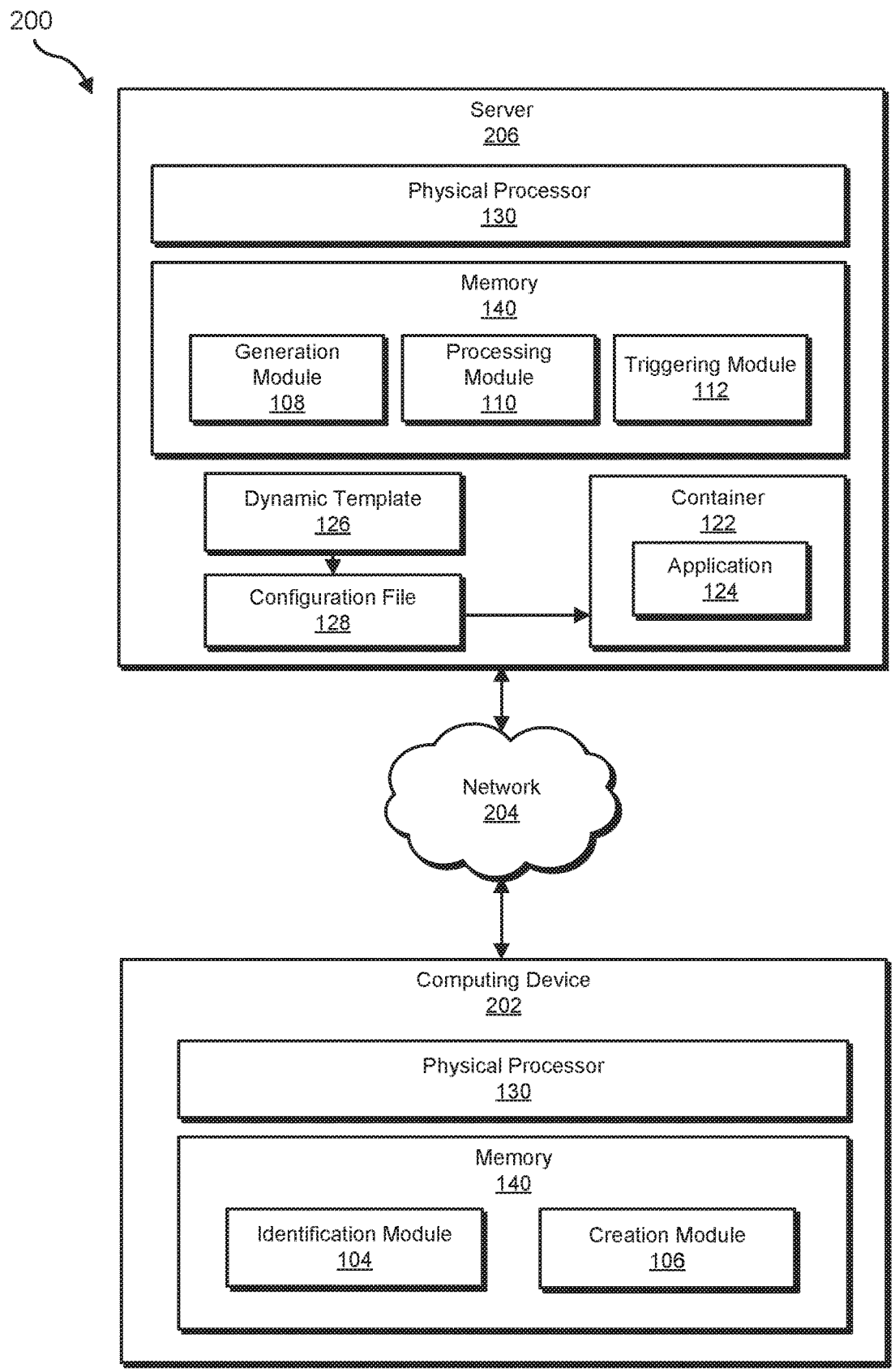
FIG. 2 is a block diagram of an additional example system for using dynamic templates to create application containers.
Figure 4:
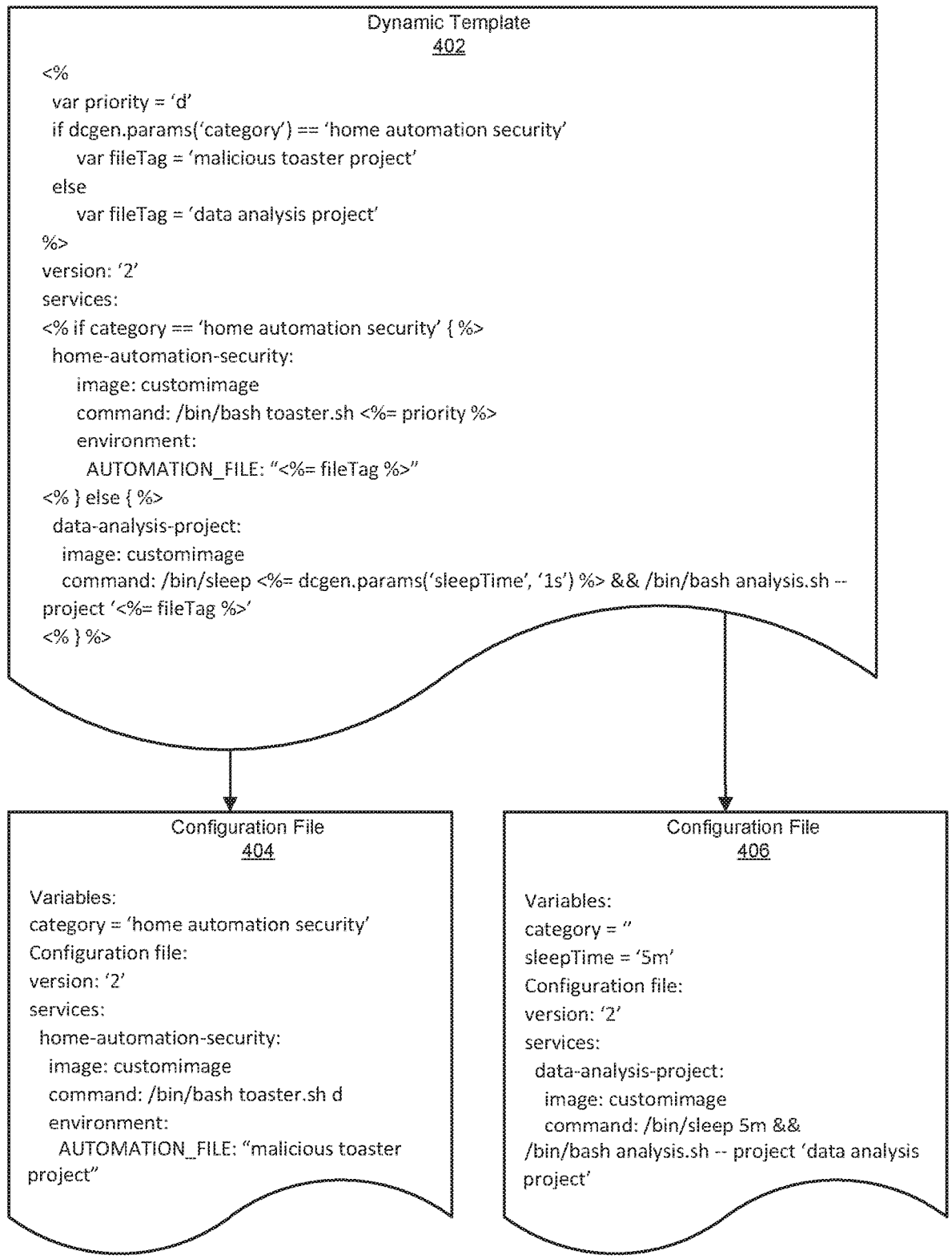
FIG. 4 is a block diagram of an example template file and an example configuration file.
Figure 5:
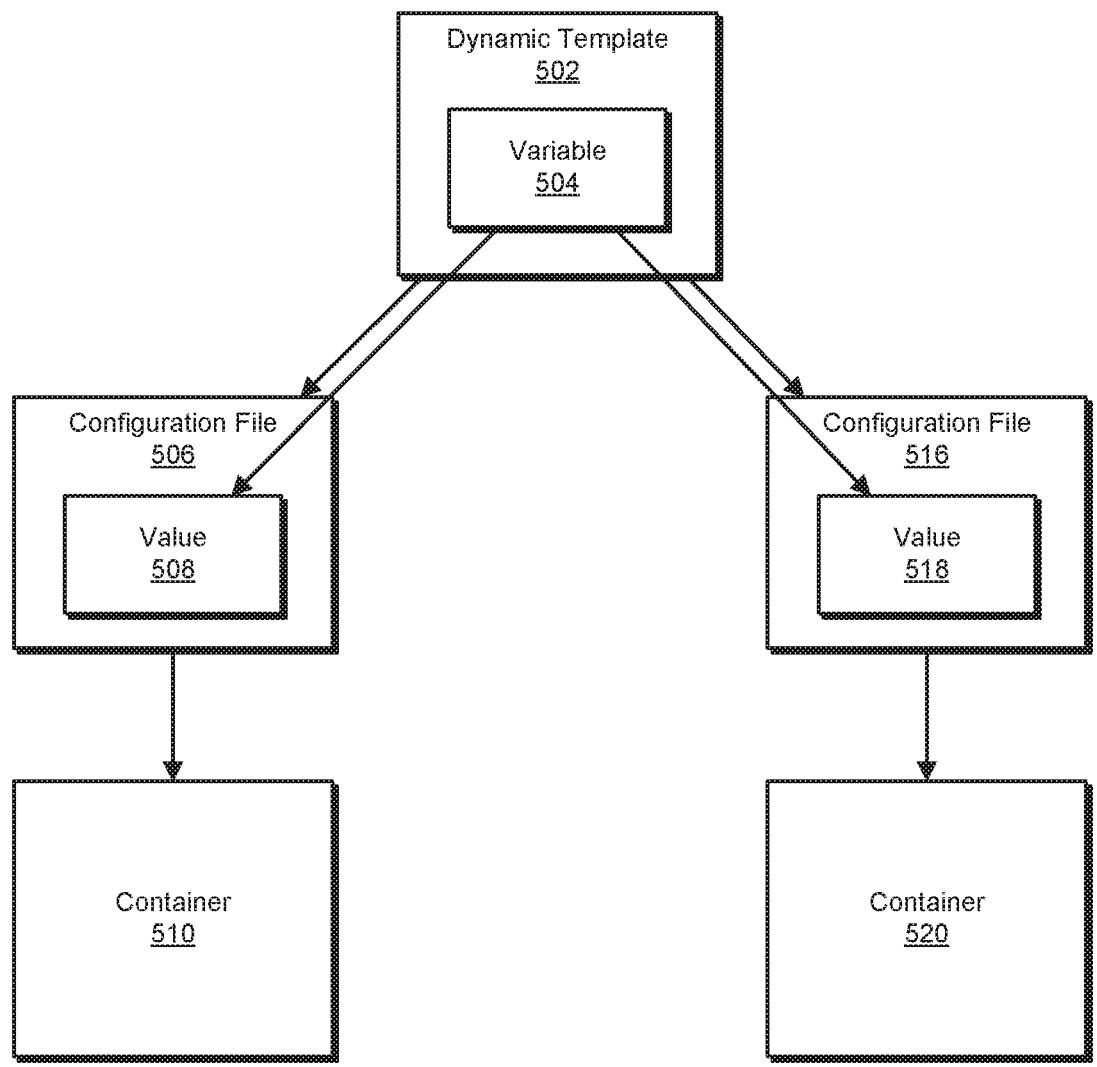
FIG. 5 is a block diagram of an example computing system for using dynamic templates to create application containers.

The following will provide, with reference to FIGS. 1, 2, and 5, detailed descriptions of example systems for using dynamic templates to create application containers. Detailed descriptions of corresponding computer-implemented methods will also be provided in connection with FIG. 3. In addition, detailed descriptions of example configuration files and templates will be provided in connection with FIG. 4.

FIG. 1 is a block diagram of example system 100 for using dynamic templates to create application containers. As illustrated in this figure, example system 100 may include one or more modules 102 for performing one or more tasks. For example, and as will be explained in greater detail below, example system 100 may include an identification module 104 that identifies an application that is to be deployed in a container. Example system 100 may additionally include a creation module 106 that creates a dynamic template that includes at least one variable parameter and that defines at least a portion of an operating environment of the container. Example system 100 may also include a generation module 108 that generates a value of the variable parameter during deployment of the application. Example system 100 may additionally include a processing module 110 that processes the dynamic template to create a configuration file that includes the value of the variable parameter. Example system 100 may also include a triggering module 112 that triggers a container initialization system to create, based on the configuration file, the container such that the container isolates a user space of the application from other software on a host system while sharing a kernel space with the other software. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate using dynamic templates to create application containers. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same variations or combinations of one or more of the same, or any other suitable physical processor.

As illustrated in FIG. 1, example system 100 may also include one or more additional elements 120, such as container 122, application 124, dynamic template 126, and/or configuration file 128. Container 122 generally represents any type or form of virtualized environment that isolates an application executing within container 122 from the host operating system without replicating an entire operating system kernel. Application 124 generally represents any type of application, process, software, and/or script capable of executing within a container. Dynamic template 126 generally represents any means of storing the data and/or code necessary to generate a configuration file for a container. Configuration file 128 generally represents any type of file used to configure the execution of a container.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system. As will be described in greater detail below, one or more of modules 102 from FIG. 1 may, when executed by at least one processor of computing device 202 and/or server 206, enable computing device 202 and/or server 206 to use dynamic templates to create application containers.

Computing device 202 generally represents any type or form of computing device capable of reading computer-executable instructions. In some embodiments, computing device 202 may be an end-user device that allows a user to create template files. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, variations or combinations of one or more of the same, or any other suitable computing device.

Server 206 generally represents any type or form of computing device that is capable of hosting one or more containers. In some embodiments, server 206 may represent one or more servers in a remote data center (i.e., cloud servers). Additional examples of server 206 include, without limitation, storage servers, database servers, application servers, and/or servers configured to run certain software applications and/or provide various storage, database, and/or web services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, or any other suitable network.

Many other devices or subsystems may be connected to computing system 100 in FIG. 1 and/or computing system 200 in FIG. 2. Conversely, all of the components and devices illustrated in FIGS. 1 and 2 need not be present to practice the embodiments described and/or illustrated herein. The devices and subsystems referenced above may also be interconnected in different ways from that shown in FIG. 2. Computing systems 100 and 200 may also employ any number of software, firmware, and/or hardware configurations. For example, one or more of the example embodiments disclosed herein may be encoded as a computer program (also referred to as computer software, software applications, computer-readable instructions and/or computer control logic) on a computer-readable medium.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Figure 3:
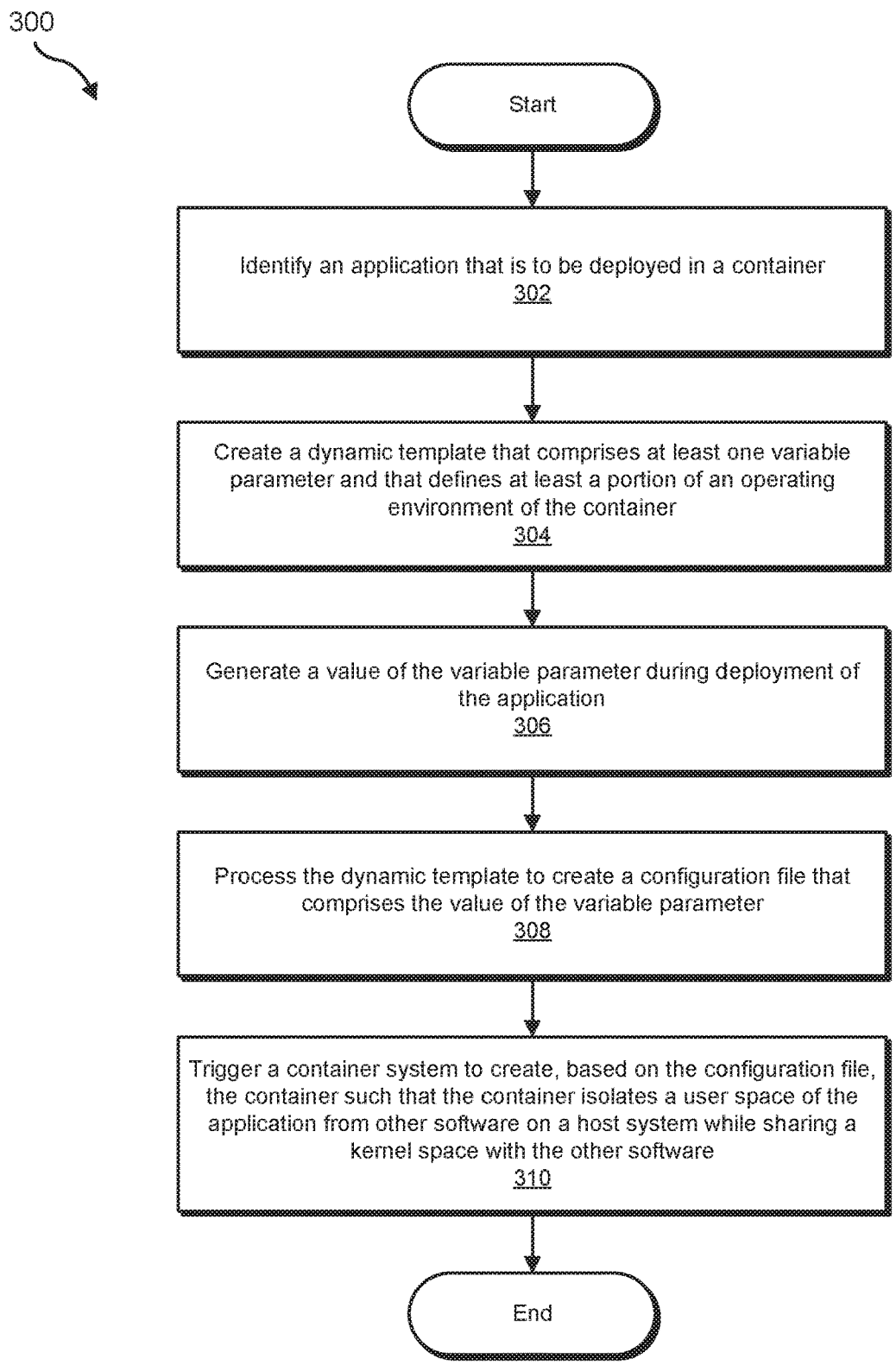
FIG. 3 is a flow diagram of an example method for using dynamic templates to create application containers.

FIG. 3 is a flow diagram of an example computer-implemented method 300 for using dynamic templates to create application containers. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may identify an application that is to be deployed in a container. For example, identification module 104 may, as part of computing device 202 in FIG. 2, identify application 124 that is to be deployed in container 122.

The term "application," as used herein, generally refers to any script, code, process, module, and/or combination of the above that performs at least one computing function. In some embodiments, an application may execute within a container and may only access resources within the container. In other embodiments, an application may execute within a container and may access resources external to the container. Examples of applications include, without limitation, processes that read data, transform data, create data, allow a user to interact with data, and/or store data. In some embodiments, an application may be part of a workflow that extracts data from data storage, transforms the data into a new format, and/or loads the data into a new repository.

The term "container," as used herein, generally refers to any type of virtual environment that does not include an entire operating system but does include enough computing resources to execute at least one process and/or application. In some embodiments, the resources and/or processes within an application container may be isolated from resources and/or processes outside the application container. For example, a container may isolate user space of a deployment system from other software on the deployment system while sharing kernel space with the other software. The term "user space," as used herein, generally refers to the portion of memory in a computing environment where application software executes. In some embodiments, user space may include libraries, graphics engines, device drivers for certain devices, and/or system daemons. The term "kernel space," as used herein generally refers to the portion of memory in a computing environment reserved for executing an operating system kernel, kernel extensions, and device drivers. In contrast virtualization environments that are not containers, such as virtual machines, may not share kernel space with other software. Other forms of application virtualization that are also not containers may share both kernel space and user space with other applications. In some embodiments, a container may execute only a single process and/or application, while in other embodiments a container may execute multiple processes and/or applications. In some embodiments, a container may be a DOCKER container.

Identification module 104 may identify an application to be deployed in a container in a variety of ways and/or contexts. For example, identification module 104 may identify a container image that is configured to execute the application when deployed. The term "container image," as used herein, generally refers to any way of storing a container, data describing a container, and/or data within a container that can be reconstructed into an executing container but is not itself an executing container. In some embodiments, a container image may be a compressed file that contains data necessary to execute the container. In another example, identification module 104 may identify a file that is capable of launching a process and/or application. For example, identification module 104 may identify an executable file used to launch a process on a WINDOWS operating system. In another example, identification module 104 may identify a script file that, when compiled by the proper compiler, will launch a process.

In some embodiments identification module 104 may examine the application in order to determine parameters that will need to be specified for the application, container, and/or host system that will be executing the application. For example, identification module 104 may determine that the application requires access to a database and expects a path to the database and/or an identifier of a database as input. In another example identification module 104 may determine that the application functions best when executing in a container that is configured in a specified way. Additionally or alternatively, identification module 104 may determine that the application is designed to communicate with one or more other applications executing in one or more other containers and that the application may require information about the other applications and/or containers.

At step 304, one or more of the systems described herein may create a dynamic template that may include at least one variable parameter and that defines at least a portion of an operating environment of the container. For example, creation module 106 may, as part of computing device 202 in FIG. 2, create dynamic template 126 that includes at least one variable parameter and that defines at least a portion of an operating environment of container 122.

The term "dynamic template," as used herein, generally refers to any file, code, and/or data that is designed to generate a configuration file that includes one or more variable parameters that define at least a portion of an operating environment of a container. In some embodiments, a dynamic template may include functions, loops, variables, argument-defined parameters, and/or other methods of dynamically calculating settings. In some embodiments, a dynamic template may also include one or more static settings. In one embodiment, a dynamic template may be formatted similarly to a type of configuration file generated by the dynamic template. For example, a dynamic template may include function references and/or variables in definitions that, in a configuration file, would include only static values. In some embodiments, a dynamic template may also include static default values that may be used for variable parameters if the variable parameters are not externally specified when the dynamic template is processed.

The term "variable parameter," as used herein, generally refers to any parameter that is not static. In some examples, a variable parameter may be calculated by a programmatic function. In other examples, a variable parameter may be input by arguments to a file and/or function. Additionally or alternatively, a variable parameter may be determined by the environment in which the file with the variable parameter is hosted. Examples of variable parameters may include, without limitation, host ports, storage settings, paths to external services and/or resources, runtime parameters for a service, usernames, passwords, hostnames, and/or image files used by services.

The term "operating environment," as used herein, generally refers to any settings and/or parameters that define a container, a host system of a container, and/or an application executing in a container. For example, an operating environment of a container may include a volume, network, and/or other resource available to the container. In another example, an operating environment of a container may include a configuration of how the container operates.

Creation module 106 may create a dynamic template in a variety of ways. For example, creation module 106 may enable an administrator to create a dynamic template. In one embodiment, creation module 106 may present an administrator with a graphical user interface that may enable the administrator to create a dynamic template. In another embodiment, creation module 106 may enable an administrator to create a dynamic template via a command line interface. In one embodiment, creation module 106 may receive input from an administrator that identifies an already-created dynamic template. Additionally or alternatively, creation module 106 may create a dynamic template programmatically using a script.

In some embodiments, creation module 106 may use information gathered by identification module 104 about an application, container, and/or host computing system to create the dynamic template. For example, if identification module 104 determined that an application to be executed in a container expects an external database, creation module 106 may create a dynamic template that includes a variable parameter that specifies a path to a database. In another example, creation module 106 may create a dynamic template that, when processed, will prompt the creation of a database expected by an application to be executed in a container. In some embodiments, creation module 106 may create a dynamic template that includes a tool for processing the dynamic template into a configuration file and/or discovering and/or launching any resources specified by the dynamic template.

At step 306, one or more of the systems described herein may generate a value of the variable parameter during deployment of the application. For example, generation module 108 may, as part of computing device 202 in FIG. 2 generate a value of the variable parameter during deployment of the application.

Generation module 108 may generate the value of the variable parameter in a variety of ways. For example, generation module 108 may generate the value of the variable parameter during deployment of the application by using a function stored in the dynamic template to calculate the value of the variable parameter. In some embodiments, generation module 108 may use code stored in the dynamic template, such as JAVASCRIPT, PHP, ASP, JSP, PERL, and/or EMBEDDED RUBY, to calculate the value of the variable parameter.

In some examples, generation module 108 may generate the value of the variable parameter during deployment of the application by determining a path of an external resource on the host system based at least in part on data about the external resource stored in the dynamic template. For example, the dynamic template may store information indicating that the application to be deployed within the container expects access to a database. In this example, generation module 108 may launch a database for the application to access and may determine the path to the launched database. In another embodiment, generation module 108 may examine the host computing device to detect the path to the database. Additionally or alternatively, generation module 108 may receive the path for an existing database as input. Additional examples of external resources that generation module 108 may detect and/or launch include, without limitation, volumes, networks, available ports, applications, and/or services.

In some embodiments, generation module 108 may enable a user to set a flag that will cause generation module 108 to generate values for variable parameters without launching external resources. For example, if a user wanted to test a dynamic template to ensure that the output was acceptable but did not actually want to create databases, networks, and/or other resources specified by the dynamic template, the user might indicate that generation module 108 should only generate values for variable parameters in the dynamic template but should not detect and/or launch external resources.

In some examples, generation module 108 may generate the value of the variable parameter during deployment of the application by receiving external input about the variable parameter during deployment of the application and generating the value of the variable parameter based at least in part on the external input. For example, generation module 108 may display a graphical user face to a user that prompts the user to enter a value for the variable parameter. In another example, generation module 108 may enable a user to input a value for the variable parameter via a command line interface.

At step 308, one or more of the systems described herein may process the dynamic template to create a configuration file that may include the value of the variable parameter. For example, processing module 110 may, as part of computing device 202 in FIG. 2, process dynamic template 126 to create configuration file 128 that may include the value of the variable parameter.

The term "configuration file," as used herein, generally refers to any file that contains at least one variable that defines at least a portion of the operating environment for a container and that contains only static variables that cannot be dynamically calculated at run time. In some embodiments, a configuration file may contain variables that may allow for substitutions at run time, such as BASH environmental variables, but may not be capable of performing more complicated calculations than substitution. In one embodiment, the configuration file may be a default type of configuration file for the container. In some examples, a configuration file may be a DOCKER-COMPOSE.YML file for a DOCKER container.

Processing module 110 may process the dynamic template file to create the configuration file in a variety of ways. For example, generation module 108 may calculate values for all of the variable parameters in the dynamic template file and then processing module 110 may create a static configuration file that includes the calculated values. In some embodiments, processing module 110 may launch and/or create resources specified in the dynamic template file. For example, processing module 110 may launch and/or create a database, open a network connection, launch an application, create an external volume, and/or launch and/or configure a service. In some examples, processing module 110 may create resources that persist after all containers launched by processing module 110 from the dynamic template that created the resources have ceased executing. For example, processing module 110 may create an external volume specified by a dynamic template and the external volume may persist even after the container launched by the dynamic template has ceased executing.

In some examples processing module 110 may process a dynamic template into a configuration file that launches multiple containers. In one example, processing module 110 may process a dynamic template may into a configuration file that launches a variable number of containers based on variable parameters. In some examples, processing module 110 may use variable parameters to link multiple containers together. For example, if a configuration file specifies a database container and a second container that uses a database from the database container, the systems described herein may specify a username and password to be used as variable parameters in the dynamic template. Processing module 110 may then process the dynamic template to configure the database container to accept a specified username and password and the second container to use the specified username and password to access the database.

In some examples, processing module 110 may process a dynamic template with multiple variable parameters that are generated in multiple ways. For example, as illustrated in FIG. 4, a dynamic template 402 may include static parameter "version" and may also include several variable parameters. In this example, processing module 110 may search the code block for the variable "priority" in order to set the value of the variable "priority." In some examples, the systems described herein may receive an external input for a function stored within the dynamic template to determine the value of a variable parameter. In this example, the systems described herein may receive external input about the "category" variable. If the category is "home automation security," the systems described herein may determine, based on the code stored in the dynamic template, that the "fileTag" variable parameter value is "malicious toaster project." If the category is not "home automation security," the systems described herein may set the value of the "fileTag" variable parameter to "data analysis project." In some embodiments, the systems described herein will receive values directly from external input. For example, dynamic template 402 may receive a value for the "sleepTime" parameter directly from external input entered when the systems described herein process dynamic template 402.

In some examples, processing module 110 may process dynamic template 402 into a configuration file 404. In this example, configuration file 404 may have static values for all of the variable parameters, based on the values calculated by the systems described herein at the time that processing module 110 processed dynamic template 402. For example, configuration file 404 may have a "category" value of "malicious toaster project," launch a container from the "customimage" image, and run the bash script "toaster.sh" with a specified priority based on input received by processing module 110 and used to create configuration file 404 from dynamic template 402. In some examples, configuration file 404 may also include an environment variable "AUTOMATION_FILE."

In another example, processing module 110 may process dynamic template 402 into configuration file 406 in response to different input for the variable parameters. In this example, if "category" is something other than "home automation security," the systems described herein may start two containers. One of the two containers may also use "customimage," but may run "bin/sleep" rather than "toaster.sh." In this example, "/bin/sleep" may use the "sleepTime" variable that was specified by a user and/or may use a default value of "1s" if "sleepTime" was not specified by a user. After executing "bin/sleep," the systems described herein may run the "analysis.sh" command. In some embodiments, a configuration file may also be linked to a second container that may be launched to perform services such as data analysis. For example, the "data-analysis-project" service may run "/bin/sleep" to wait for the data analysis service container to fully launch so that "analysis.sh" can run and make use of the data analysis service.

Returning to FIG. 3, at step 310, one or more of the systems described herein may trigger a container initialization system to create, based on the configuration file, the container such that the container isolates a user space of the application from other software on a host system while sharing a kernel space with the other software. For example, triggering module 112 may as part of computing device 202 in FIG. 2, trigger container the initialization system to create, based on configuration file 128, container 122 such that container 122 isolates a user space of application 124 from other software on a host system while sharing a kernel space with the other software.

The term "container initialization system," as used herein, generally refers to any application, module, script, and/or code capable of executing a container. In some embodiments, a container initialization system may take a container image file as input and may launch the container from the image file. In some embodiments, a container initialization system may include a container engine. For example, the container initialization system may be the DOCKER container engine.

Triggering module 112 may trigger the container initialization system to create the container based on the configuration file in a variety of contexts. In some embodiments, triggering module 112 may be part of a deployment container that deploys the container that is configured by the configuration file. In some embodiments, triggering module 112 may trigger the creation of the container configured by the configuration file when a container image of the container is deployed to a host system.

In some examples, the systems described herein may generate different configuration files from the same dynamic template. In one example, identification module 104 may identify an additional application that is to be deployed in an additional container, generation module 108 may generate a new value of the variable parameter during deployment of the additional application that is different from the value of the variable parameter, processing module 110 may process the dynamic template to create an additional configuration file that includes the new value of the variable parameter, and triggering module 112 may trigger the container initialization system to create, based on the additional configuration file, the additional container. For example, as illustrated in FIG. 5, a dynamic template 502 may include a variable 504. The systems described herein may process dynamic template 502 into a configuration file 506 that has a value 508 for variable 504 and also into a configuration file 516 that has a value 518 that is different than value 508. The systems described herein may then use configuration file 506 to configure a container 510 and configuration file 516 to configure a container 520.

The systems described herein may create two different configuration files from the same dynamic template in a variety of circumstances. In some examples, the dynamic template may include a variable parameter that receives external input and the systems described herein may receive different external input for the first configuration file than for the second. For example, the dynamic template may allow a user to specify a username and password for a service that will be accessed by an application that will execute in the container, and the systems described herein may launch multiple containers that each authenticate to a different account for the service. In another example, a dynamic template may include a variable parameter that specifies a path to and/or an identifier of an external resource of a specified type. In this example, the systems described herein may process the dynamic template into different configuration files on different computing systems that have different paths to the resource of the specified type. In another example, a dynamic template may include a variable parameter that is a port number and the systems described herein may process the dynamic template into different configuration files that specify different port numbers depending on which ports are already in use on the host computing systems.

In some examples, the systems described herein may deploy two or more applications that access the same external resource. The systems described herein may check to see if the external resource exists and/or may launch the external resource if the external resource does not already exist. In some examples, the systems described herein may create different dynamic templates and process the different dynamic templates into different configuration files for different containers that both specify the path to the external resource accessed by applications in both containers. In other examples, the systems described herein may configure both containers with configuration files created from the same dynamic template that includes a variable parameter that specifies a path to the external resource.

As explained in connection with method 300 above, the systems and methods described herein may define a dynamic template that represents a blueprint which will be preprocessed by the systems described herein by having its parameters filled in and its code blocks evaluated in order to produce a configuration file that the systems described herein will use to configure a container. In some embodiments, the template may be a file similar in structure to the configuration file but designed to include markup syntax and/or programming code. In some embodiments, the systems described herein may also include a tool that takes parameters for the dynamic template and/or processes the dynamic template into a configuration file. In some examples, the systems described herein may also make changes to the environment of the host computing system to which the container is deployed, for example by starting services and/or resources. By creating dynamic templates and generating configuration files based on those templates, the systems and methods described herein may enable administrators and/or automated systems to efficiently configure and launch containers in a variety of environments and contexts.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the modules described herein may configure a computing system (e.g., a server) to facilitate multi-tenancy for one or more of the functions described herein. For example, one or more of the modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor).

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), variations or combinations of one or more of the same, or any other suitable mobile computing devices. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms regardless of the particular type of computer-readable media used to actually carry out the distribution. The embodiments disclosed herein may also be implemented using modules that perform certain tasks. These modules may include script, batch, or other executable files that may be stored on a computer-readable storage medium or in a computing system. In some embodiments, these modules may configure a computing system to perform one or more of the example embodiments disclosed herein.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method, at least a portion of the method being performed by a computing device comprising at least one processor, the method comprising:
   identifying a first application for deployment in a first container and a second application for deployment in a second container, the first application and the second application being included in a user space of a host system comprising the user space and a kernel space;
   identifying at least one variable parameter for use by the first application and the second application;
   creating a first dynamic template comprising a function for calculating a value for the at least one variable parameter;
   deploying the first application in the first container by:
      calculating the value of the at least one variable parameter using the function; and processing, subsequent to calculating the value, the first dynamic template, by creating a first configuration file comprising the value of the at least one variable parameter;

creating a second dynamic template comprising the function for calculating the value for the at least one variable parameter; and deploying the second application in the second container by:
   calculating the value of the at least one variable parameter using the function; and
   processing, subsequent to calculating the value, the second dynamic template by creating a second configuration file comprising the value of the at least one variable parameter.

2. The computer-implemented method of claim 1, wherein
   deploying the first application in the first container by calculating the value of the at least one variable parameter using the function comprises determining a path of an external resource on the host system based at least in part on data about the external resource stored in the first dynamic template.

3. The computer-implemented method of claim 1, wherein deploying the first application in the first container further comprises receiving external input about the at least one variable parameter during the deployment of the first application.

4. The computer-implemented method of claim 3, wherein calculating the value of the at least one variable parameter using the function is based at least in part on the external input.

5. The computer-implemented method of claim 1, wherein the first configuration file further comprises at least one static parameter.

6. The computer-implemented method of claim 1, further comprising:
   identifying an additional application included in the user space for deployment in an additional container;
   deploying the additional application in the additional container by:
      calculating a new value of the at least one variable parameter using the function;
      processing, subsequent to calculating the new value, the first dynamic template by creating an additional configuration file comprising the new value of the at least one variable parameter; and
      triggering a container initialization system to create, based on the additional configuration file, the additional container for executing the additional application such that the additional container isolates the user space of the additional application from other software on the host system while sharing the kernel space of the host system with the other software.

7. The computer-implemented method of claim 1, wherein:
   creating the second configuration file comprises launching a resource;
   deploying the first application in the first container further comprises triggering a container initialization system to create, based on the first configuration file, the first container for executing the first application;
   deploying the second application in the second container further comprises triggering the container initialization system to create, based on the second configuration file, the second container for executing the second application; and the method further comprises enabling the first container and the second container to access the resource that is external to the first container and the second container.

8. A system comprising:
   an identification module, stored in memory, that:
      identifies a first application for deployment in a first container and a second application for deployment in a second container, the first application and the second application included in a user space of a host system comprising the user space and a kernel space; and
      identifies at least one variable parameter for use by the first application and the second application;
   a creation module, stored in memory, that:
      creates a first dynamic template comprising a function for calculating a value for the at least one variable parameter; and
      creates a second dynamic template comprising the function for calculating the value for the at least one variable parameter;
   a generation module, stored in memory, that:
      calculates, during a deployment of the first application in the first container, the value of the at least one variable parameter using the function; and
      calculates, during a deployment of the second application in the second container, the value of the at least one variable parameter using the function;
   a processing module, stored in memory, that:
      processes, during the deployment of the first application in the first container, the first dynamic template to create a first configuration file comprising the value of the at least one variable parameter; and
      processes, during the deployment of the second application in the second container, the second dynamic template to create a second configuration file comprising the value of the at least one variable parameter; and
   at least one physical processor configured to execute the identification module, the creation module, the generation module, and the processing module.

9. The system of claim 8, wherein the creation module determines a path of an external resource on the host system based at least in part on data about the external resource stored in the first dynamic template.

10. The system of claim 8, wherein the generation module during the deployment of the first application in the first container:
   receives external input about the at least one variable parameter; and
   calculates the value of the at least one variable parameter using the function based at least in part on the external input.

11. The system of claim 8, wherein the first configuration file further comprises at least one static parameter.

12. The system of claim 8, wherein:
   the identification module identifies an additional application included in the user space for deployment in an additional container;
   the generation module calculates, during a deployment of the additional application in the additional container, a new value of the at least one variable parameter using the function;
   the processing module, processes, during the deployment of the additional application in the additional container, the first dynamic template to create an additional configuration file comprising the new value of the at least one variable parameter;

the system further comprises a triggering module, stored in memory, that triggers, during the deployment of the additional application in the additional container, a container initialization system to create, based on the additional configuration file, the additional container for executing the additional application such that the additional container isolates the user space of the additional application from other software on the host system while sharing the kernel space of the host system with the other software; and the at least one physical processor is further configured to execute the triggering module.

13. The system of claim 8, wherein:

creating the second configuration file comprises launching a resource;

the system further comprises a triggering module, stored in memory, that:

triggers, during the deployment of the first application in the first container, a container initialization system to create, based on the first configuration file, the first container for executing the first application;

triggers, during the deployment of the second application in the second container, the container initialization system to create, based on the second configuration file, the second container for executing the second application; and enables the first container and the second container to access the resource that is external to the first container and the second container; and the at least one physical processor is further configured to execute the triggering module.

14. A non-transitory computer-readable medium comprising one or more computer-readable instructions that, when executed by at least one processor of a computing device, cause the computing device to:

identify a first application for deployment in a first container and a second application for deployment in a second container, the first application and the second application included in a user space of a host system comprising the user space and a kernel space;

identify at least one variable parameter for use by the first application and the second application;

create a first dynamic template comprising a function for calculating a value for the at least one variable parameter; and deploy the first application in the first container by:

calculating the value of the at least one variable parameter using the function; and processing, subsequent to calculating the value, the first dynamic template by creating a first configuration file comprising the value of the at least one variable parameter;

create a second dynamic template comprising the function for calculating the value for the at least one variable parameter; and deploy the second application in the second container by:

calculating the value of the at least one variable parameter using the function; and processing, subsequent to calculating the value, the second dynamic template by creating a second configuration file comprising the value of the at least one variable parameter.

15. The non-transitory computer-readable medium of claim 14, wherein deploying the first application in the first container by calculating the value of the at least one variable parameter using the function comprises determining a path of an external resource on the host system based at least in part on data about the external resource stored in the first dynamic template.

16. The non-transitory computer-readable medium of claim 14, wherein deploying the first application in the first container further comprises receiving external input about the at least one variable parameter during the deployment of the first application.

17. The non-transitory computer-readable medium of claim 16, wherein calculating the value of the at least one variable parameter using the function is based at least in part on the external input.

18. The non-transitory computer-readable medium of claim 14, wherein the first configuration file further comprises at least one static parameter.

19. The non-transitory computer-readable medium of claim 14, wherein the one or more computer-readable instructions further cause the computing device to:

identify an additional application included in the user space for deployment in an additional container;

deploy the additional application in the additional container by:

calculating a new value of the at least one variable parameter using the function;

processing, subsequent to calculating the new value, the first dynamic template by creating an additional configuration file comprising the new value of the at least one variable parameter; and triggering a container initialization system to create, based on the additional configuration file, the additional container for executing the additional application such that the additional container isolates the user space of the additional application from other software on the host system while sharing the kernel space of the host system with the other software.

20. The non-transitory computer-readable medium of claim 14, wherein:

creating the second configuration file comprises launching a resource;

deploying the first application in the first container further comprises triggering a container initialization system to create, based on the first configuration file, the first container for executing the first application;

deploying the second application in the second container further comprises triggering the container initialization system to create, based on the second configuration file, the second container for executing the second application; and the one or more computer-readable instructions further cause the computing device to enable the first container and the second container to access the resource that is external to the first container and the second container.

\* \* \* \* \*